United States Patent [19]

Muhlogger

[11] 3,831,021
[45] Aug. 20, 1974

[54] ILLUMINATING DEVICE, PARTICULARLY FOR PHOTOGRAPHIC ENLARGING APPARATUS

[75] Inventor: Leopold Muhlogger, Brixen, Italy

[73] Assignee: Durst A.G. Fabrik Fototechnischer Apparate, Bolzano-Bozen, Italy

[22] Filed: June 4, 1973

[21] Appl. No.: 366,406

[30] Foreign Application Priority Data
June 9, 1972    Italy.................................. 25444/72

[52] U.S. Cl. .......... 240/41 R, 240/41.55, 350/96 T, 355/35, 355/71
[51] Int. Cl............................................. F21m 1/00
[58] Field of Search...... 240/41 R, 41.55; 350/96 T; 355/35, 67, 70, 71

[56] References Cited
UNITED STATES PATENTS
3,492,070   1/1970   Zahn.................................. 355/70 X
3,684,371   8/1972   Weisglass et al...................... 355/71
FOREIGN PATENTS OR APPLICATIONS
825,205   12/1951   Germany............................. 355/71

OTHER PUBLICATIONS
Myer, J.H., "Zoomable Kaleidoscopic Mirror Tunnel," Applied Optics, Sept. 1971, Vol. 10, No. 9, pages 2179–2182.

Primary Examiner—Fred L. Braun
Attorney, Agent, or Firm—Connolly and Hutz

[57] ABSTRACT

An illuminating device, particularly for a photographic enlarger and having a continuously variable intensity, includes a first mirrored shaft or casing connected at right angles to a second mirrored shaft (having a variable cross-section) by a cold light reflector which allows the infrared light components to pass through it. The first mirrored shaft has a continuously variable diaphragm and a shutter for controlling the amount of light transmitted to the second mirrored shaft. Diffusers and filters are inserted in the shafts for varying the quality of the light. The cross-sectional area of the second shaft is changed by varying the magnitude of engagement between angle corners and flat mirrored sides.

14 Claims, 2 Drawing Figures

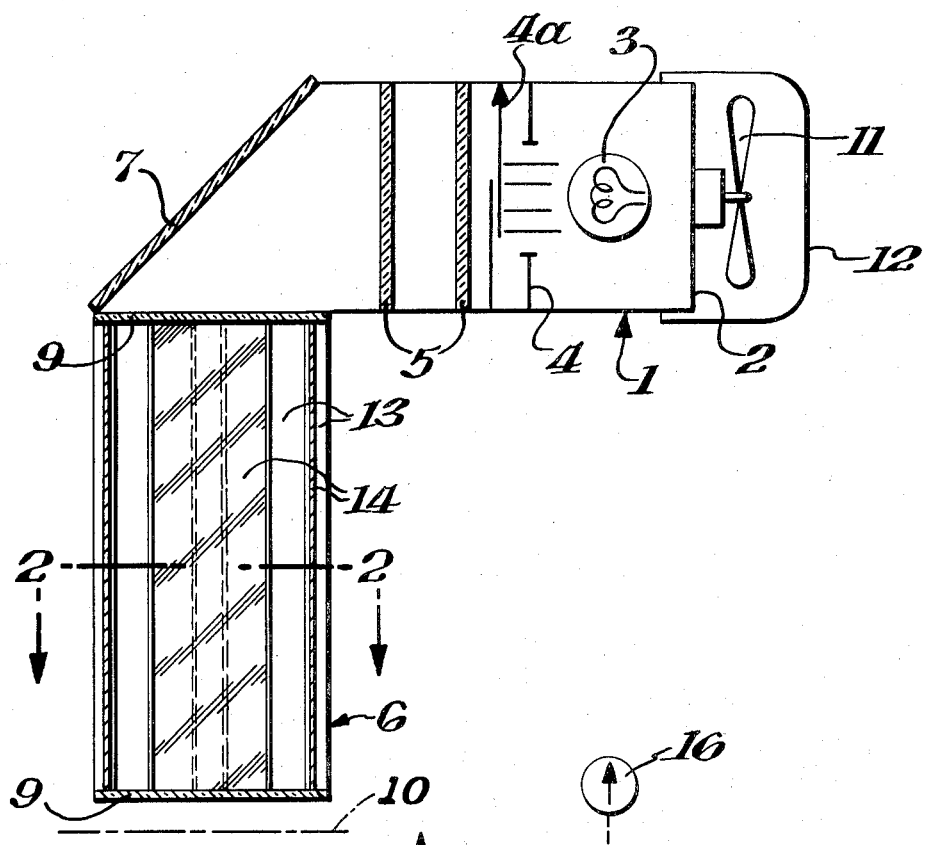
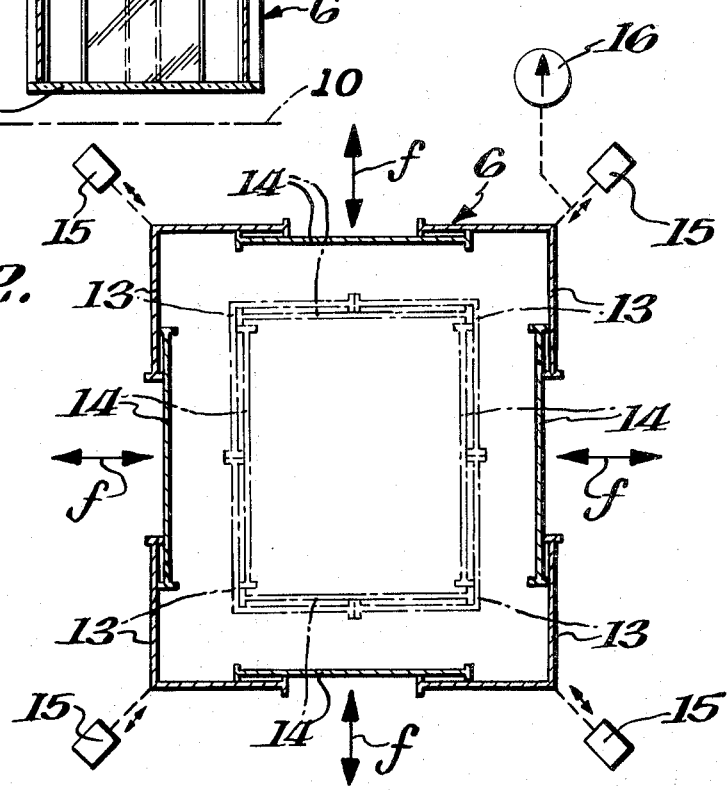

3,831,021

ILLUMINATING DEVICE, PARTICULARLY FOR PHOTOGRAPHIC ENLARGING APPARATUS

BACKGROUND OF THE INVENTION

This invention relates to an illuminating device for lighting a surface, particularly for a photographic enlarging apparatus, in which the intensity of the light must be controlled preferably in a continuous manner. In known types of photographic enlarging apparatus in which the intensity of the light is regulated at the illuminated plane at which the original copies or transparencies are situated, the intensity of the illumination of the light source is varied in steps or continuously by electrically switching devices. In most of the aforementioned types of light sources, such electrical switching devices are considerably expensive. Furthermore, with some light sources, it is not possible to regulate the intensity without changing the spectral properties of the projected light which highly limits their use for photographic purposes. An object of this invention is to eliminate the aforementioned disadvantages and to provide an illuminating device, even incorporating light sources which are difficult to control, which permits the light intensity in the illuminated plane to be continuously regulated without changing the color temperature or quality of the illuminating light throughout its entire range of intensity variation.

SUMMARY

In accordance with this invention, an illuminating device having a light source operating under steady or constant conditions is disposed within a first mirrored shaft or casing having a controllable diaphragm in its aperture, which is preferably continuously controlled. A second mirrored shaft is connected to the first and has a variable cross-section, which is particularly continuously variable. The second variable cross-section mirrored shaft may be advantageously connected to the first at an angle, particularly at right angles, with a light reflecting or deflecting means provided between the shafts for deflecting the light from the first through the second. The deflector may advantageously be a cold light mirror which permits the infrared components in the light to pass through it, thus reducing the amount of heat impinging on the copies or transparencies to be projected by the illuminating light. The variable cross-sectional mirrored shaft is preferably constructed of movable angular corners whose sides are covered or engaged by mirrored sheets or plates. This unique illuminating device has the advantage of eliminating the expense of special electrical switching devices for regulating the intensity of the light source. The light source therefore operates under steady electrical conditions, which even permits light sources which are extremely difficult to control to be used with the color temperature or quality of the light remaining constant throughout. This device also permits the most advantageous kind of illumination to be provided for each image format and detail by means of the variable cross-sectional mirrored shaft.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 1 is a diagrammatic longitudinal cross-section taken through one embodiment of this invention; and FIG. 2 is an enlarged cross-sectional view taken through FIG. 1 along the line 2—2.

DESCRIPTION OF THE PREFERRED EMBODIMENT

In FIGS. 1 and 2 is shown a mirrored shaft 1 which is closed on the right by end wall 2 and in which is disposed a light source 3 operated under steady or constant electrical and light producing conditions. Diaphragm 4 having a controllable aperture is mounted on the opposite side of light source 3 from end wall 2. Diaphragm 4 may be manually controlled or by a motorized activating device not shown.

Shutter 4a is provided in front of diaphragm 4 for controlling the amount of light emanating from the illuminating device. Shutter 4a is advantageously electrically operated to permit both the regulation of light intensity as well as amount to be automatically controlled by a unitary automatic system.

One or more light diffusing lenses and/or filters 5 are mounted in mirrored shaft 1 ahead of shutter 4a depending upon image requirements. Filters 5 may also be constructed as heat filters.

A second mirrored shaft 6 is connected to the end of first mirrored shaft 1, opposite end wall 2, preferably at a right angle thereto. The cross-section of mirror shaft 6 is continuously variable. A light deflector, for example, an inclined mirror 7 is provided between light shafts 1 and 6 for deflecting the light emanating from light source 3 into mirrored shaft 6.

It is also possible to attach mirrored shaft 6 in dispositions other than illustrated in FIG. 1, such as in line with mirrored shaft 1 so that the axes of mirrored shafts 1 and 6 coincide with each other. This would eliminate the necessity for a deflecting mirror 7. Diffusing lenses and/or filters 9 may be provided at the ends of the mirrored shaft 6. Filters 9 may also be constructed as heat filters. Supporting area 10 for the original copies or transparencies to be projected is disposed closely adjacent the light emitting end of mirrored shaft 6 of variable cross-section.

Fan 11 is provided within hood 12 covering end wall 2 in order to cool the casing of mirrored shaft 1. Removal of heat may also be accompanied by any other suitable means. The amount of heat transmitted from the light emitting end of mirrored shaft 6 is reduced by constructing mirror 7 as a cold light mirror, which is permeable by the infrared components of the light emanating from light source 3 and which reflects the cooler components of the light.

As shown in FIG. 2, mirrored shaft 6 having a variable cross-section includes angle corners or units 13 which are movable in the direction of arrows $f$. Angle corners 13 have sides which overlap with plate-shaped mirror sheets 14 inserted within angle units 13 and which overlap the insides of angle corners 13. The angle corners 13 and internal mirrored sheets 14 may move between the two positions indicated in the drawing in solid and phantom outline to change the cross-section of mirror shaft 6, preferably continuously. Angle corners 13 are, for example, shifted between the two illustrated positions by any suitable mechanical arrangement 15 (which may include bent levers, threaded rods or geared racks and pinions) either by hand or by means of suitable operating motors. An indicating apparatus 16 may be provided to display the size of the cross-section to which mirrored shaft is set, and its indication may be remotely communicated.

I claim:

1. An illuminating device, particularly for a photographic enlarging apparatus, comprising a first mirrored shaft having an outlet, a light source in said first mirrored shaft emanating light, a second mirrored shaft having an inlet, an outlet and a variable cross section, said inlet of said second mirrored shaft being connected to said outlet of said first mirrored shaft to receive light therefrom and conduct it through and to said outlet of said second mirrored shaft, and a variable diaphragm being disposed in said first mirrored shaft between said light source and its outlet whereby the intensity of light emanating from said outlet of said second mirrored shaft is controlled in response to variation of said variable diaphragm in combination with the variation in said cross section of said second mirrored shaft.

2. An illuminating device as set forth in claim 1 wherein said second mirrored shaft has a continuously variable cross section whereby said intensity of said light is continuously varied.

3. An illuminating device as set forth in claim 1 wherein said second mirrored shaft is disposed at an angle with respect to first mirrored shaft, and light deflecting means is provided between said mirrored shafts for reflecting light from said first mirrored shaft through said second mirrored shaft.

4. An illuminating device as set forth in claim 3 wherein said angle is a right angle.

5. An illuminating device as set forth in claim 3 wherein said light deflecting means comprises a mirror disposed at an angle with respect to said mirrored shafts.

6. An illuminating device as set forth in claim 5 wherein said mirror is a cold light mirror permeable to infrared components of said light emanating from said light source and which reflects the remaining cooler components of said light through said second mirrored shaft.

7. An illuminating device as set forth in claim 1 wherein a shutter is disposed between said light source and said outlet from said first mirrored shaft for controlling the amount of light emanating therefrom.

8. An illuminating device as set forth in claim 1 wherein moving devices are connected to said second mirrored shaft for varying its cross section.

9. An illuminating device as set forth in claim 1 wherein an indicating apparatus is connected with said second mirrored shaft for providing an indication of the cross section to which it is set.

10. An illuminating device as set forth in claim 1 wherein light quality varying components are inserted within said mirrored shafts.

11. An illuminating device as set forth in claim 10 wherein said light quality varying components comprise diffusing lenses.

12. An illuminating device as set forth in claim 10 wherein said light quality varying components comprise filters.

13. An illuminating device as set forth in claim 12, wherein one or more of said filters comprise heat filters.

14. An illuminating device, particularly for a photographic enlarging apparatus, comprising a first mirrored shaft having an outlet, a light source in said first mirrored shaft emanating light, a second mirrored shaft having an inlet, an outlet and a variable cross section, said inlet of said second mirrored shaft being connected to said outlet of said first mirrored shaft to receive light therefrom and conduct it through and to said outlet of said second mirrored shaft whereby the intensity of light emanating from said outlet of said second mirrored shaft is controlled in response to the variation in said cross section of said second mirrored shaft, said second mirrored shaft comprising angle corners overlapped with mirror sheets, and movable means connecting said angle corners and said movable sheets.

* * * * *